(12) United States Patent
Prasad et al.

(10) Patent No.: US 10,549,997 B2
(45) Date of Patent: Feb. 4, 2020

(54) PROCESS FOR THE PRODUCTION OF GRAPHENE SHEETS WITH TUNABLE FUNCTIONALITIES FROM SEAWEED PROMOTED BY DEEP EUTECTIC SOLVENTS

(71) Applicant: Council of Scientific & Industrial Research, New Delhi (IN)

(72) Inventors: Kamlesh Prasad, Gujarat (IN); Mukesh Sharma, Gujarat (IN); Dibyendu Mondal, Gujarat (IN); Arka Saha, Gujarat (IN); Nripat Singh, Gujarat (IN)

(73) Assignee: Council of Scientific & Industrial Research, New Delhi (IN)

( * ) Notice: Subject to any disclaimer, the term of this patent is extended or adjusted under 35 U.S.C. 154(b) by 421 days.

(21) Appl. No.: 15/330,852

(22) Filed: Nov. 7, 2016

(65) Prior Publication Data

US 2018/0126368 A1    May 10, 2018

(51) Int. Cl.
*C01B 32/184* (2017.01)
*B01J 27/138* (2006.01)
(Continued)

(52) U.S. Cl.
CPC ............ *C01B 32/184* (2017.08); *B01J 27/128* (2013.01); *B01J 27/135* (2013.01); *B01J 27/138* (2013.01);
(Continued)

(58) Field of Classification Search
CPC ........ B01J 27/138; B01J 27/128; B01J 31/26; B01J 31/30; B01J 31/0271; B01J 35/12;
(Continued)

(56) References Cited

FOREIGN PATENT DOCUMENTS

| CN | 103449399 A | 12/2013 |
|----|-------------|---------|
| CN | 102807210 B | 6/2014  |

(Continued)

OTHER PUBLICATIONS

Mondal, et al., Deep eutectic solvent promoted one step sustainable conversation of fresh seaweed biomass to functionalized graphene as a potential electrocatalyst, Green Chem. 2016; 18: 2819-2826 with Electronic Supporting Information (published online on Jan. 26, 2016) (Year: 2016).*

(Continued)

*Primary Examiner* — Daniel C. McCracken
(74) *Attorney, Agent, or Firm* — Wood, Herron & Evans, LLP

(57) ABSTRACT

The present invention relates to the process for the scalable production of $Fe_3O_4/Fe$, Sn & Zn doped graphene nanosheets from a naturally abundant seaweed resources such as *Sargassum tenerrimum, Sargassum wighti, Ulva faciata, Ulva lactuca* and *Kappaphycus alvarezii*. The granules remained after the recovery of liquid juice from the fresh seaweeds were utilized as a raw material and a deep eutectic solvents (DESs) generated by the complexation of choline chloride and $FeCl_3$, $ZnCl_2$ and $SnCl_2$ were employed as template as well as catalyst for the production graphene nanosheets functionalized with metals. Pyrolysis of the mixture of seaweed granules and DES at 700-900° C. under 95% $N_2$ and 5% $H_2$ atmosphere resulted formation of metal doped graphene sheets with high surface area (120-225 $m^2 \cdot g^{-1}$) and high electrical conductivity 2384 $mS \cdot m^{-1}$ to 2400 $mS \cdot m^{-1}$. The nanosheets thus obtained could remove substantial amount of fluoride from fluoride contaminated drinking water (95-98%).

19 Claims, 3 Drawing Sheets
(3 of 3 Drawing Sheet(s) Filed in Color)

(51) Int. Cl.
| | |
|---|---|
| *B01J 27/135* | (2006.01) |
| *B01J 27/128* | (2006.01) |
| *B01J 31/02* | (2006.01) |
| *B01J 35/12* | (2006.01) |
| *C02F 1/28* | (2006.01) |
| *H01M 4/90* | (2006.01) |
| *H01M 8/083* | (2016.01) |
| *B01J 31/26* | (2006.01) |
| *B01J 31/30* | (2006.01) |
| *C02F 101/14* | (2006.01) |

(52) U.S. Cl.
CPC ........... *B01J 31/0271* (2013.01); *B01J 35/12* (2013.01); *C02F 1/283* (2013.01); *H01M 4/90* (2013.01); *H01M 8/083* (2013.01); *B01J 31/26* (2013.01); *B01J 31/30* (2013.01); *C02F 2101/14* (2013.01); *C02F 2303/16* (2013.01)

(58) Field of Classification Search
CPC .. B01J 27/135; C01B 32/184; C01B 2204/22; C01B 2204/32; H01M 4/90; H01M 8/083; H01M 4/625; Y02P 70/56; C02F 1/488; C02F 1/283; C02F 2101/14; C02F 2303/16
See application file for complete search history.

(56) References Cited

FOREIGN PATENT DOCUMENTS

| | | |
|---|---|---|
| CN | 104045077 A | 9/2014 |
| CN | 104118873 A | 10/2014 |
| CN | 104118874 A | 10/2014 |
| CN | 104386684 A | 3/2015 |

OTHER PUBLICATIONS

Brun, N. et al., "Biosourced nitrogen doped microcellular monoliths" [ChemSusChem. 2014, 7, 397-401].

Chandra, V. et al., "Water dispersible magnetite reduced graphene oxide composites for arsenic removal" [ACS Nano. 2010,7, 3979-3986].

Dodson, J. R. et al., "Shaped mesoporous materials from fresh macroalgae" [J Mat Chem A. 2013,1, 5203-5207].

Falco, C. et al., "Renewable nitrogen doped hydrothermal carbons derived from microalgae" [ChemSusChem. 2012, 5, 1834-1840].

Primo, A. et al, "From biomass wastes to large area, high quality, N-doped graphene: catalyst free carbonization of chitosan coating on arbitrary substrates" [Chemical Communications 2012, 48, 9254-9256].

Sharma, M. et al., "Production of partially reduced graphene oxide nanosheets using a seaweed sap" [RSC Adv., 2014, 4, 64583-645881.

Thompson, E. et al., "Iron catalyzed graphitization of biomass" [Green Chemistry 2015, 17, 551-556].

Zhou, G. et al., "Graphene wrapped Fe3O4 anode material with improved reversible capacity and cyclic stability for Li-Ion batteries" [Chemistry Materials 2010, 22, 5306-5313].

* cited by examiner

PROCESS FOR THE PRODUCTION OF GRAPHENE SHEETS WITH TUNABLE FUNCTIONALITIES FROM SEAWEED PROMOTED BY DEEP EUTECTIC SOLVENTS

FIELD OF THE INVENTION

The present invention relates to an improve process for facile production of functionalized graphene nanosheets from fresh seaweed employing deep eutectic solvents (DESs). More particularly, the present invention relates to direct production of $Fe_3O_4$/Fe graphene, ZnO/Zn doped graphene and $SnO_2$/Sn doped graphene nanosheets from granular seaweed biomass obtained after expelling the liquid (useful as liquid fertilizer) from fresh seaweeds such as *Sargassum* spp, *Ulva* spp., *Kappaphycus alvarezii*. Still more particularly, the functionalized graphene nanosheets were prepared through pyrolysis of semi-solid composite of seaweed granules and deep eutectic solvents under inert atmosphere.

BACKGROUND OF THE INVENTION

Seaweeds are considered as one of the most productive biomass resources on the earth. Among the number of other advantages, they don't compete for agricultural land for growth and expansion, they are naturally fertilized by ocean nutrients and hence there is no burden of fertilizer at all for their growth, their growth rate is very high in comparison to terrestrial plants, they can be cultivated and harvested multiple times in a year. Despite the huge potential, estimated about only 1% of macro algae resources are utilized till now and there is a tremendous opportunity to use the seaweeds as resource for the production of fine high value chemicals. Few species of brown seaweeds are being commercially exploited for the production of alginic acid and they are of interest in Europe due to their very high growth rate (131 t $ha^{-1} \cdot Y^-$).

Reference may be made to the patent entitled "Method for preparing carbon material with graphene-like structure from biomass" [CN 103449399 A dated Dec. 28, 2013], which discloses a method of preparation of high-quality carbon material with graphene-like structure from biomass using microwave carbonization without any pretreatment of the starting material.

Reference may be made to the patent entitled "Method for preparing graphene with biomass-derived carbonaceous mesophase" [CN 102807210 B dated Jun. 25, 2014], which discloses a method of preparation of graphene from biomass comprising of impregnation of powdered monocrystalline silicon, polysilicon, mica or quartz in biomass-derived carbonaceous mesophase-ethanol solution followed by drying to obtain the base substance with surface attached by a layer of biomass-derived carbonaceous mesophase thin film.

Reference may be made to the patent entitled "One kind of graphene and graphene preparation" [CN 104386684 A dated Dec. 16, 2014], wherein various biomass used were pre-treated with sodium periodate in aqueous solution at 50° C. for 2 h followed by dissolution in sodium hydroxide solution and eventually pyrolysed in presence of various metal catalysts to get the graphene.

Reference may be made to the patent entitled "A method for preparing activated carbon/graphene composite" [CN 104118874 A dated Oct. 29, 2014], which discloses a method of preparation of a composite comprising of activated carbon and graphene obtained by uniformly mixing biomass, carbonitride and a transition metal compound followed by heating the mixture.

Reference may be made to the patent entitled "Preparation method of activated porous graphene with good conductivity and dispersibility from porous cellulose by bleaching, activation and carbonization" [CN 104118873 A dated Oct. 29, 2014], which discloses a method of preparation of activated porous graphene by hydrolysis of biomass resource (cornstalk, corncob, etc.) in acid (sulfuric acid, nitric acid, etc.) followed by activation and carbonization of porous cellulose thus obtained.

Reference may be made to the patent entitled "Method for preparing graphene three-dimensional hierarchical porous carbon material" [CN 104045077 A dated Sep. 17, 2014], which discloses a method of preparation of graphene three-dimensional hierarchical porous carbon material having wrinkle lamellar structure and microporous and macroporous multi-level pore structure using coconut shell, palm shells and apricot shells and other biomass as raw materials such as resource-rich bio-waste.

Reference may be made to the paper entitled "Shaped mesoporous materials from fresh macroalgae" [J Mat Chem A. 2013,1, 5203-5207] where a method for the preparation of low-density and highly mesoporous structures from seaweeds such as *Laminaria digitata, Laminaria hyperborean, Saccharina latissima, Ascophyllym nodosum* and *Fucus vesiculosus* by solvent exchange followed by drying was described.

Reference may be made to the paper entitled "Biosourced nitrogen doped microcellular monoliths" [Chem Sus Chem. 2014, 7, 397-401] where the microsized carbon monoliths were obtained by the treatment of phloroglucinol or 5-hydroxymethyl-2-furfuraldehyde or N-acetyl glucosamine with $FeCl_3.6H_2O$.

Reference may be made to the paper entitled "Water dispersible magnetite reduced graphene oxide composites for arsenic removal" [ACS Nano. 2010,7, 3979-3986] where $Fe_3O_4$ functionalized reduced graphene oxide was prepared by the reduction of graphene oxide using $NH_3$ solution and hydrazine hydrate at elevated temperature and under acute alkaline conditions.

Reference may be made to the paper entitled "Seaweed derived heteroatom doped highly porous carbon as an electro catalyst for the oxygen reduction reaction" [Chem Sus Chem. 2014, 7, 1755-1763] where N and S doped porous carbon structure was obtained by the pyrolysis of *Undaria pinnatifida* without using any template.

Reference may be made to the paper entitled "Renewable nitrogen doped hydrothermal carbons derived from microalgae" [Chem Sus Chem. 2012, 5, 1834-1840] where N doped hydrothermal carbon was obtained by the hydrothermal carbonization of *Spirulina platensis* and mixture of the micro algae and glucose.

Reference may be made to the paper entitled "P-doped graphene obtained by the pyrolysis of modified alginate as a photocatalyst for hydrogen generation from water/methanol mixture" [Angew Chem Int Edn. 2013, 52, 11813-11816] where $H_2PO_4^-$ was added in colloidal solution of sodium alginate followed by pyrolysis and ultrasonication of the phosphorylated alginate mass.

Reference may be made to the paper entitled "Iron catalyzed graphitization of biomass" [Green Chemistry 2015, 17, 551-556] where soft wood was converted to graphitic carbon by graphitization by reacting with $Fe(NO_3)_3$ under inert atmosphere.

Reference may be made to the paper entitled "Graphene wrapped $Fe_3O_4$ anode material with improved reversible capacity and cyclic stability for Li-ion batteries" [Chemistry Materials 2010, 22, 5306-5313] where iron hydroxide was reduced in situ between the graphene nano sheets to yield graphene material wrapped with $Fe_3O_4$ suitable for energy storage applications.

Reference may be made to the paper entitled "P-n heterojunction of doped graphene films obtained by pyrolysis of biomass precursors" [Small 2014, doi 10.1002/smll.201402278] where nitrogen doped graphene having characteristics of n-type semiconductors was obtained by the pyrolysis of nanometric chitosan films. Similarly boron doped graphene having characteristics of p-type semiconductors were obtained by the pyrolysis borate ester of sodium alginate.

Reference may be made to the paper entitled "From biomass wastes to large area, high quality, N-doped graphene: catalyst free carbonization of chitosan coating on arbitrary substrates" [Chemical Communications 2012, 48, 9254-9256] where chitosan films were pyrolysed under argon atmosphere at elevated temperature to yield high quality single layer N-doped graphene film.

Reference may be made to the paper entitled "From coconut shell to porous graphene like nano sheets for high power super capacitors" [Journal of Material Chemistry A 2013, 1, 6462-6470] where porous graphene like nano sheets with large surface area was synthesized by simultaneous activation-graphitization of coconut waste shells using $FeCl_3$ as catalyst and $ZnCl_2$ as activating agent.

Reference may be made to an article entitled "Production of partially reduced graphene oxide nanosheets using a seaweed sap" [RSC Adv., 2014, 4, 64583-64588], wherein reduced graphene oxide nanosheets were obtained by the reduction of graphene oxide in the seaweed sap obtained by the mechanical crushing of *Kappaphycus alvarezii* seaweed.

OBJECT OF THE INVENTION

The main object of the present invention is to provide a sustainable process for the scalable production of functionalized graphene nanosheets with tunable properties directly from naturally abundant fresh seaweed biomass employing deep eutectic solvents as solvent as well as catalyst.

Another object is to value addition of fresh seaweed in the process through mechanical crushing of the fresh seaweed to separate sap and granules.

Another object is to utilize the granules as raw material for synthesis of graphene and to utilize the sap as liquid fertilizers.

Another object is to utilize red (*Kappaphycus alvarezii*), brown (*Sargassum tenerrimum*) and green (*Ulva fasciata*) seaweed or the phycocolloids present in those seaweeds in the process for the production of graphene.

Another object is to prepare a semi-solid composite combining seaweed granules and deep eutectic solvents. The deep eutectic solvents employed are the mixture of choline chloride and $FeCl_3$, $SnCl_2$ and $ZnCl_2$ at 1:2 molar ratios.

Another object is to produce functionalized graphene nanosheets from the above semi-solid composites by pyrolysis at 700° C.-900° C. in 95% $N_2$ and 5% $H_2$ atmosphere.

Another object is to produce carbon materials directly by the pyrolysis of the DES in the absence of seaweeds for comparison with functionalized graphene prepared from seaweeds in the presence of DESs.

Another object is to prepare heteroatom doped graphene nanosheets having high BET surface area and high electrical conductivity.

Another object is to check the suitability of the functionalized graphene nanosheets for the water purification and application as catalyst in oxygen reduction reaction.

SUMMARY OF THE INVENTION

Accordingly the present invention provides sustainable and scalable process for the synthesis of graphene nanosheets with tunable functionalities which comprise the following steps:

crushing and centrifugation of freshly harvested seaweed to separate sap and solid residue (granular biomass)

preparing deep eutectic solvents combing choline chloride (ChCl) and metal salts in suitable ratio followed by heating at 80° C. for 1-2 h to get a homogenous solution preparing a semi-solid composite of granular biomass and deep eutectic solvent by heating at 80° C. for 30-60 minutes heating the above semi-solid composite as obtain in step (iii) at 700° C.-900° C. under 95% $N_2$ and 5% $H_2$ atmosphere collecting and washing the blackish product obtained after step (iv) and ensuring the formation of functionalized graphene nanosheets

DETAILED DESCRIPTION OF THE PREFERRED EMBODIMENTS

In an embodiment of the present invention the seaweed as mentioned in step (i) includes brown seaweed such as *Sargassum tenerrimum*, red seaweed such as *Kappaphycus alvarezii* and green seaweed, respectively. Lignocellulosic biomass including waste biomass can also be converted to graphene nanosheets through the process explored in the present invention.

In another embodiment of the present invention the yields of sap and dry granular biomass from fresh *Sargassum* seaweed were in the range of 60-80% w/v and 0.75-1.5% w/w, respectively.

In yet another embodiment of the present invention the sap extracted from fresh *Sargassum* seaweed contains $Na^+$ (500-600 ppm), $K^+$ (300-400 ppm), $Ca^{2+}$ (100-150 ppm), $Mg^{2+}$ (100-150 ppm), $Fe^{2+/3+}$ (3-5 ppm), $Zn^{2+}$ (2-4 ppm), $Cu^{2+}$ (0.5-1 ppm), $Mn^{2+}$ (0.5-1 ppm), indole acetic acid (10-15 ppm), Zeatin (10-13 ppm) and gibberellins ($GA_g$).

In yet another embodiment of the present invention the granule obtained from fresh *Sargassum* seaweed contains $Na^+$ (1-1.5 wt %), $K^+$ (0.5-1 wt %), $Ca^{2+}$ (1.5-2 wt %), $Mg^{2+}$ (1-1.5 wt %), $Fe^{2+/3+}$ (0-0.5 ppm), $Zn^{2+}$ (0.01-0.02 wt %), $Cu^{2+}$ (2-3 ppm), $Mn^{2+}$ (15-20 ppm), C (34-35%), H (4-5%), N (1.3-1.6%) and S (0.5-1%).

In yet another embodiment of the present invention the deep eutectic solvents as mentioned in step (ii) employed ChCl—$FeCl_3$ (1:2), ChCl:—$ZnCl_2$ (1:2) and ChCl—$SnCl_2$ (1:2), respectively.

In an yet another embodiment of the present invention the semi-solid composite as mentioned in step (iii) was prepared by mixing seaweed granule with ChCl—$FeCl_3$ (1:2), ChCl—$ZnCl_2$ (1:2) and ChCl—$SnCl_2$ (1:2), respectively with 1:2 to 1:3 weight ratio of granule to deep eutectic solvent.

In yet another embodiment of the present invention the semi-solid composites of *Sargassum* granules and deep eutectic solvent when pyrolysed under inert atmosphere up to 1000° C. showed higher mass loss compared to only *Sargassum* granule as confirmed by TGA and DTG analysis.

In yet another embodiment of the present invention the semi-solid composites of *Sargassum* granule and ChCl—

FeCl$_3$ when calcined at 700° C. (SAR-Fe-700) for 3-4 h gave heteroatom doped magnetic graphene nanosheets containing various elements such as Na$^+$ (1-1.2 wt %), K$^+$ (0.75-1 wt %), Ca$^{2+}$ (2-2.5 wt %), Mg$^{2+}$ (0.4-0.6 wt %), Fe$^{2+/3+}$ (6-7 wt %), Zn$^{2+}$ (0.01-0.03 wt %), Cu$^{2+}$ (0.007-0.009 wt %), Mn$^{2+}$ (0.2-0.4 wt %), C (22-23 wt %), H (2-3 wt %), N (2-2.5 wt %) and S (0.75-1 wt %).

In yet another embodiment of the present invention the semi-solid composites of *Sargassum* granule and ChoCl—FeCl$_3$ when calcined at 800° C. (SAR-Fe-800) for 3-4 h gave heteroatom doped magnetic graphene nanosheets containing various elements such as Na$^+$ (0.5-0.8 wt %), K$^+$ (0.4-0.5 wt %), Ca$^{2+}$ (2-2.5 wt %), Mg$^{2+}$ (1.5-2 wt %), Fe (10-11 wt %), Zn$^{2+}$ (0.3-0.5 wt %), Cu$^{2+}$ (0.005-0.007 wt %), Mn$^{2+}$ (0.1-0.2 wt %), C (23-24 wt %), H (2-3 wt %), N (1-1.5 wt %) and S (0.5-0.8 wt %).

In yet another embodiment of the present invention the semi-solid composites of *Sargassum* granule and ChoCl—FeCl$_3$ when calcined at 900° C. (SAR-Fe-900) for 3-4 h gave heteroatom doped magnetic graphene nanosheets containing various elements such as Na$^+$ (0.2-0.3 wt %), K$^+$ (0.1-0.2 wt %), Ca$^{2+}$ (2.5-3 wt %), Mg$^{2+}$ (0.5-1 wt %), Fe (16-18 wt %), Zn$^{2+}$ (0.01-0.03 wt %), Cu$^{2+}$ (0.02-0.04 wt %), Mn$^{2+}$ (0.06-0.08 wt %), C (7-8 wt %), H (0.9-1 wt %), N (0.9-1 wt %) and S (0.005-0.01 wt %).

In yet another embodiment of the present invention the magnetic graphene nanosheets SAR-Fe-700 showed the presence of Fe$_3$O$_4$ (confirmed by powder XRD) and the sheet like morphology was visible in the SEM, TEM and AFM images. The formation of graphene was confirmed by Raman study.

In yet another embodiment of the present invention the magnetic graphene nanosheets SAR-Fe-800 showed the presence of mixture of Fe and Fe$_3$O$_4$ (confirmed by powder XRD) and the sheet like morphology was visible in the SEM, TEM and AFM images. The formation of graphene was confirmed by Raman study.

In yet another embodiment of the present invention the magnetic graphitic carbon nanosheets SAR-Fe-900 showed the presence of mixture of Fe (confirmed by powder XRD) and the sheet like morphology was visible in the TEM and AFM images. This composite did not show any 2D peak in Raman spectra and hence graphene formation was not observed for this sample.

In yet another embodiment of the present invention the magnetic graphene nanosheets SAR-Fe-700 showed electrical conductivity 2384 mS·m$^{-1}$ to 2400 mS·m$^{-1}$; BET surface area 220-225 m$^2$·g$^{-1}$ and average pore size 2.802 nm. SAR-Fe-800 showed BET surface area 165-170 m$^2$·g$^{-1}$ and average pore size 2.795 nm. SAR-Fe-900 showed BET surface area 130-135 m$^2$·g$^{-1}$ and average pore size 4.183 nm.

In yet another embodiment of the present invention the semi-solid composites of *Sargassum* granule and ChoCl—ZnCl$_2$ when calcined at 700° C., 800° C. and 900° C., respectively (SAR-Zn-700, SAR-Zn-800 and SAR-Zn-900, respectively) for 3-4 h gave heteroatom doped graphene nanosheets containing various elements such as Na$^+$ (0.6-1.5 wt %), K$^+$ (0.4-2.5 wt %), Ca$^{2+}$ (5-7 wt %), Mg$^{2+}$ (1.5-2.1 wt %), Fe (0.0-0.1 wt %), Zn$^{2+}$ (0.8-18.5 wt %), Mn$^{2+}$ (0.0-0.01 wt %), C (44-47 wt %), H (2-3 wt %), N (0.4-1 wt %) and S (0.6-2 wt %).

In yet another embodiment of the present invention the semi-solid composites of *Sargassum* granule and ChoCl—SnCl$_2$ when calcined at 700° C., 800° C. and 900° C., respectively (SAR-Sn-700, SAR-Sn-800 and SAR-Sn-900, respectively) for 3-4 h gave heteroatom doped graphene nanosheets containing various elements such as Na$^+$ (1.2-1.4 wt %), K$^+$ (0.6-1 wt %), Ca$^{2+}$ (4-6 wt %), Mg$^{2+}$ (1.5-2 wt %), Fe (0.0-0.17 wt %), Zn$^{2+}$ (1.5-2.62 wt %), C (23-41 wt %), H (2-3 wt %), N (0.4-1.2 wt %) and S (0.1-1.05 wt %).

In yet another embodiment of the present invention the semi-solid composites of *Kappaphycus* granule and ChoCl—FeCl$_3$ when calcined at 800° C. (KAR-Fe-800) for 3-4 h gave heteroatom doped graphene nanosheets containing various elements such as Na$^+$ (1.1-1.2 wt %), K$^+$ (5-6 wt %), Ca$^{2+}$ (1.1-1.2 wt %), Mg$^{2+}$ (0.25-0.3 wt %), Fe (3-4 wt %), Zn$^{2+}$ (1-1.1 wt %), C (40-41 wt %), H (2-3 wt %), N (1-1.2 wt %) and S (1-1.05 wt %).

In yet another embodiment of the present invention the magnetic graphene nanosheets were used for 80-98% removal of fluoride from drinking water.

In yet another embodiment of the present invention the magnetic graphene nanosheets were utilized as elctrocatalyst for oxygen reduction reaction in alkaline fuel cell. The Fe$_3$O$_4$/Fe doped graphene nanosheets when employed as catalyst, demonstrated positive onset potential, greater cathodic current density, low hydrogen peroxide formation (<5%) and ideal 4-electrons transfer for whole potential range in alkaline media.

DETAILED DESCRIPTION OF THE INVENTION

Figure 1:
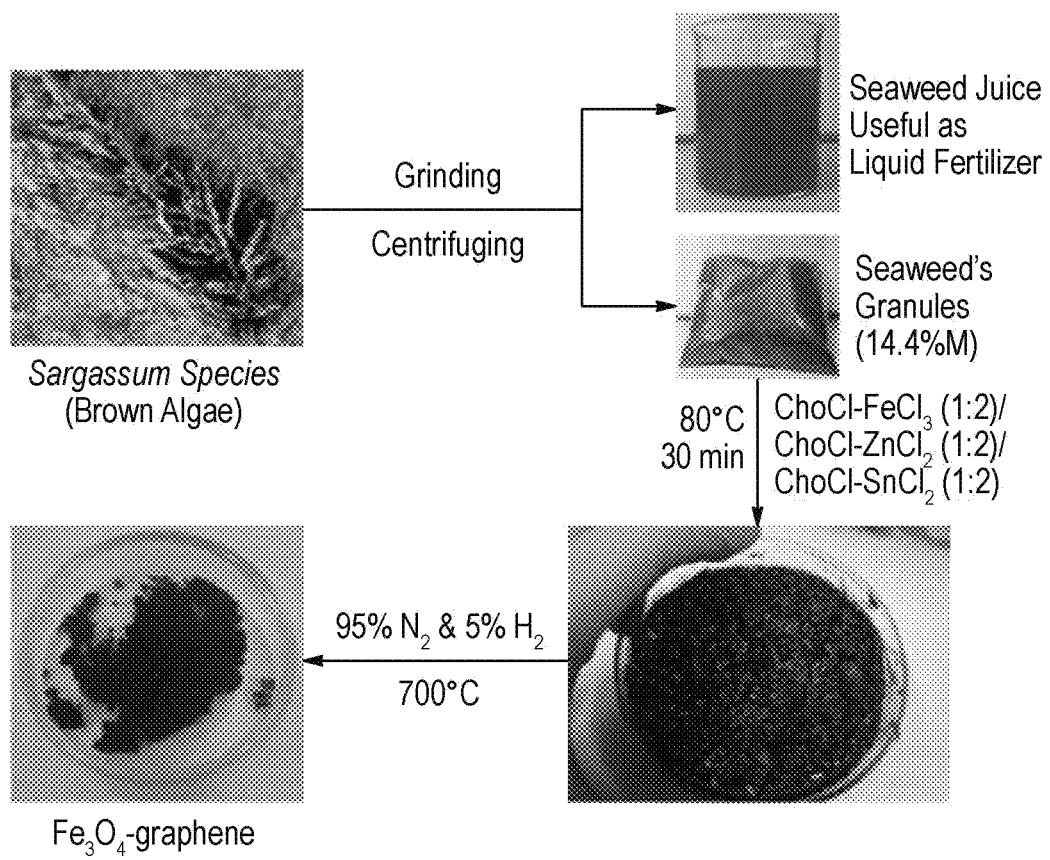
FIG. 1: Schematic depiction of production of functionalized graphene nanosheets from seaweed promoted by deep eutectic solvents

The present invention provides a facile and scalable process for the synthesis of graphene nanosheets with tunable functionalities from seaweed biomass and deep eutectic solvents as shown in FIG. 1, which is a schematic depiction of the production of functionalized graphene nanosheets from seaweed promoted by deep eutectic solvents. The process comprises the following steps:

crushing and centrifugation of freshly harvested seaweed to separate sap and solid residue (granular biomass)

preparing deep eutectic solvents combing choline chloride (ChoCl) and metal salts in suitable ratio followed by heating at 80° C. for 1-2 h to get a homogenous solution preparing a semi-solid composite of granular biomass and deep eutectic solvent by heating at 80° C. for 30-60 minutes heating the above semi-solid composite as obtain in step (iii) at 700° C.-900° C. under 95% N$_2$ and 5% H$_2$ atmosphere collecting and washing the blackish product obtained after step (iv) and ensuring the formation of functionalized graphene nanosheets.

Recognising that the fresh seaweed *Sargassum tenerrimum* is available abundantly and naturally in various seashores, its precious utilisation for direct production of functionalized graphene sheets is of considerable importance.

Recognising that the fresh seaweed *Sargassum tenerrimum* contains more than 80% moisture, thus separation of liquid and solid residue led to its dual utilization i.e., for the production of functionalized graphene and as foliar sprays to increase grain yield of black gram in pot culture experiments.

Recognising that deep eutectic solvents have wide range of solvation property and can be synthesized from low cost components such as choline chloride and metal salts and further recognizing that production of graphene directly from carbon source required template which mostly metal salts, thus metal salts based deep eutectic solvents were employed as both solvent and catalyst for the production of graphene nanosheets.

Recognising that pyrolysis of only *Sargassum* granules under inert atmosphere led to the production of amorphous carbon composites, preparation of a semi-solid composite of granules and deep eutectic solvents in a suitable ration to soak the complete solvents was one of the inventive step which led to production of functionalized graphene nanosheets.

Recognising huge oxygen functionalities present in the semi-solid composites due to high polysaccharides content mixed gas composition such as 95% $N_2$ and 5% $H_2$ was flowed thorough tubular furnace during pyrolysis.

Optimizing suitable ratio of granules and deep eutectic solvent and suitable pyrolysis temperature led to production high quality graphene having high surface area and high conductivity.

EXAMPLES

The following examples serve to provide the best mode of practice for the present invention, and should not be constructed as limiting the scope of the invention.

Example-1

As taught in the prior art, the deep eutectic solvents (ChoCl:$FeCl_3$, ChoCl:$ZnCl_2$ and ChoCl:$SnCl_2$) utilized in the present invention were prepared by heating choline chloride (ChoCl) with $FeCl_3$, $SnCl_2$ and $ZnCl_2$, respectively, at 80° C. in optimized molar ratio of 1:2 (ChoCl:Metal salts) under stirring conditions for 30-60 minutes until homogenous liquid were formed.

This example teaches the synthesis of deep eutectic solvents employed in the present invention.

Example-2

In a typical experimental procedure, *Sargassum tenerrimum* was harvested from the west coast of India (22°28' N, 69°4' E). The freshly harvested seaweed was mechanically crushed followed by centrifugation to obtain liquid sap as supernatant which were stored under refrigeration (1 Kg fresh *Sargassum tenerrimum* yielded 600 mL sap). The remaining solid residues (granules) were dried in oven (75 g of dry granules with 14.2 wt % moisture from 1 Kg fresh seaweed). This granular biomass was utilized as carbon source for the synthesis of graphene composites.

This example teaches the simultaneous production of sap (a useful liquid fertilizer) and granular biomass (substrate for graphene synthesis) from fresh *Sargassum tenerrimum* seaweed.

Example-3

The sap as obtained in Example 2 above was centrifuge to remove the suspended particles and analyzed for its inorganic constituents. It was found that the sap contained 574 ppm of $Na^+$, 318 ppm of $K^+$, 123 ppm of $Ca^{2+}$, 122 ppm of $Mg^{2+}$, 3.4 ppm of $Fe^{2+}$, 550 ppb of $Cu^{2+}$, 800 ppb of $Mn^{2+}$ and 2.3 ppm of $Zn^{2+}$. Thus the sap is rich in macro and micronutrient.

This example teaches that instead of drying and using the whole seaweed, it would advantageous to separate liquid and solid residue as the liquid part is rich in useful elements which have utility as liquid fertilizer.

Example-4

In a typical experimental procedure, 5 g of dried granules (14.2 wt % moisture) as obtained in Example 2 was added to ChoCl:$FeCl_3$(1:2) in 1:2 weight ratio (optimized amount sufficient to soak the granules) followed by heating at 80° C. for 30 minutes until a semi-solid composites is formed.

The above experiment was repeated with ChoCl:$ZnCl_2$ (1:2) and ChoCl:$SnCl_2$ (1:2) as deep eutectic solvents to obtained semi-solid composites of granules with ChoCl—$ZnCl_2$ in 1:2 weight ratio and ChoCl—$SnCl_2$ in 1:2.5 weight ratio, respectively. The other experimental conditions were same as above.

This Example teaches the synthesis of composites with *Sargassum* granules and deep eutectic solvents and the optimization of ratio of deep eutectic solvent required to obtain a semi-solid composite.

Example-5

In a typical experimental procedure, 2.44 g of the semi-solid composites composed of *Sargassum* granules and ChoCl—$FeCl_3$ mixture (as obtained from Example 4) was calcined at 700° C. in the presence of 95% $N_2$ and 5% $H_2$ gas in a tubular furnace for 4 h at 3° C./min temperature ramp. After completing the pyrolysis, 0.54 g of black flaky carbon powder was collected and washed with distilled water for several times followed by drying to yield magnetic graphene composites (SAR-Fe-700). The presence of $Fe_3O_4$ in the composites was confirmed by FTIR and powder XRD analysis, whereas the formation of graphene sheets was confirmed by XRD, Raman and TEM analysis. Inductively coupled plasma-optical emission spectroscopy (ICP-OES) analysis and CHNS analysis of SAR-Fe-700 revealed the presence of several inorganic constituents as shown in Table 1. Surface area analysis showed that the composites SAR-Fe-700 had BET surface area 220.7 $m^2/g$ and pore size 2.80 nm.

This example teaches synthesis of $Fe_3O_4$ doped graphene composites having magnetic property. This example further teaches the Fe content in SAR-Fe-700 was found to be 6.62 wt %, whereas the concentration of other inorganic elements were in the range of 0.02-2.5% except Cu and Ni. Thus besides $Fe_3O_4$, the composite SAR-Fe-700 was found to be doped with other heteroatom.

TABLE 1

Elemental composition of graphene-Fe composites

| Elements | SAR-Fe-700 (%) | SAR-Fe-800 (%) | SAR-Fe-900 (%) |
|---|---|---|---|
| Na | 1.17 | 0.74 | 0.29 |
| K | 0.86 | 0.48 | 0.14 |
| Ca | 2.02 | 2.21 | 2.73 |
| Mg | 0.47 | 1.68 | 0.98 |
| Fe | 6.62 | 10.01 | 17.71 |

TABLE 1-continued

Elemental composition of graphene-Fe composites

| Elements | SAR-Fe-700 (%) | SAR-Fe-800 (%) | SAR-Fe-900 (%) |
|---|---|---|---|
| Zn | 0.02 | 0.51 | 0.02 |
| Ni | 0.007 | 0.018 | 0.05 |
| Cu | 0.009 | 0.006 | 0.03 |
| Mn | 0.31 | 0.16 | 0.07 |
| C | 22.33 | 23.27 | 7.29 |
| H | 2.46 | 2.34 | 0.93 |
| N | 2.02 | 1.33 | 0.99 |
| S | 0.84 | 0.76 | 0.01 |

Example-6

In a typical experimental procedure, 2.53 g of the semi-solid composites composed of *Sargassum* granules and ChoCl—FeCl$_3$ mixture (as obtained from Example 4) was calcined at 800° C. in the presence of 95% N$_2$ and 5% H$_2$ gas in a tubular furnace for 4 h at 3° C./min temperature ramp. After completing the pyrolysis, 0.48 g of black flaky carbon powder was collected and washed with distilled water for several times followed by drying to yield magnetic graphene composites (SAR-Fe-800). The presence of mainly Fe and nominal amounts of Fe$_3$O$_4$ in the composites was confirmed by FTIR and powder XRD analysis, whereas the formation of graphene sheets was confirmed by XRD, Raman and TEM analysis. ICP-OES and CHNS analysis of SAR-Fe-800 revealed the presence of several inorganic constituents as shown in Table 1. Surface area analysis showed that the composites SAR-Fe-800 had BET surface area 167.8 m$^2$/g and pore size 2.79 nm.

This example teaches synthesis of mixture of Fe and Fe$_3$O$_4$ doped graphene composites having magnetic property. This example further teaches the Fe content in SAR-Fe-800 was found to be 10.01 wt %, whereas the concentration of other inorganic elements were in the range of 0.01-2.4% except Cu. Thus besides Fe and Fe$_3$O$_4$, the composite SAR-Fe-800 was found to be doped with other heteroatom.

Figure 2:
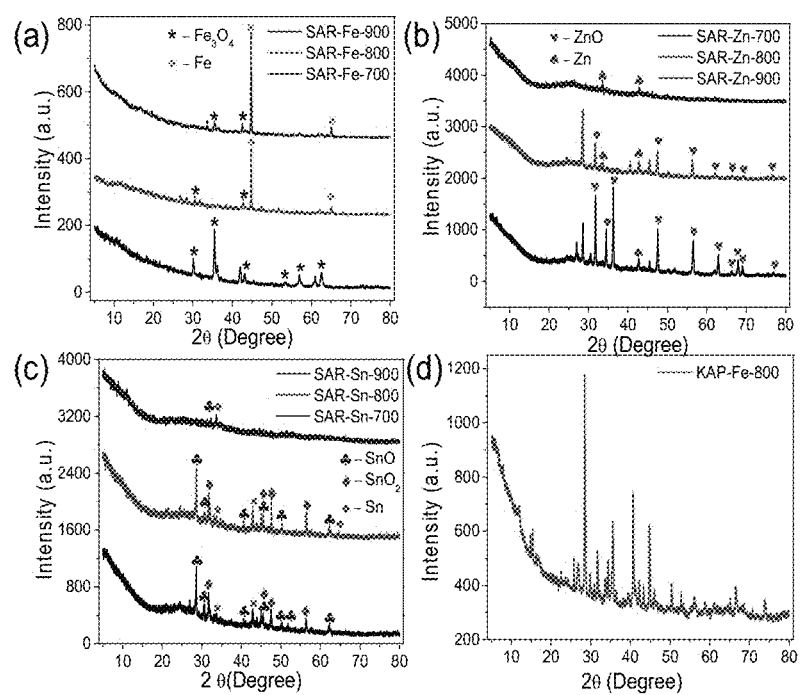
FIG. 2: Powder XRD spectra of graphene composites synthesized by the calcinations of *Sargassum* or *Kappaphycus* granules and DES semi-solid mixtures. (a) SAR-ChoCl:FeCl$_3$, (b) SAR-ChoCl:ZnCl$_2$, (c) SAR-ChoCl:SnCl$_2$ and (d) KAP-ChoCl:FeCl$_3$

FIG. 2 provides powder XRD spectra of graphene composites synthesized by the calcinations of *Sargassum* or *Kappaphycus* granules and DES semi-solid mixtures. (a) SAR-ChoCl:FeCl$_3$, (b) SAR-ChoCl:ZnCl$_2$, (c) SAR-ChoCl:SnCl$_2$ and (d) KAP-ChoCl:FeCl$_3$.

Example-7

In a typical experimental procedure, 2.62 g of the semi-solid composites composed of *Sargassum* granules and ChoCl—FeCl$_3$ mixture (as obtained from Example 4) was calcined at 900° C. in the presence of 95% N$_2$ and 5% H$_2$ gas in a tubular furnace for 4 h at 3° C./min temperature ramp. After completing the pyrolysis, 0.46 g of black powder was collected and washed with distilled water for several times followed by drying to yield magnetic graphene composites (SAR-Fe-900). The presence of Fein major amount in the composite was confirmed by FTIR and powder XRD analysis, whereas the formation of graphene sheets was not shown by Raman spectra. ICP-OES and CHNS analysis of SAR-Fe-900 revealed the presence of several inorganic constituents as shown in Table 1. Surface area analysis showed that the composites SAR-Fe-900 had BET surface area 132.0 m$^2$/g and pore size 4.18 nm.

This example teaches synthesis of mainly Fe doped graphitic carbon composites having magnetic property. This example further teaches the Fe content in SAR-Fe-900 was found to be 17 wt %, whereas the concentration of other inorganic elements were in the range of 0.01-2.8%. Thus besides Fe, the composite SAR-Fe-900 was found to be doped with other heteroatom.

Example-8

In a typical experimental procedure, 4.13 g of the semi-solid composites composed of *Sargassum* granules and ChoCl—ZnCl$_2$ mixture (as obtained from Example 4) was calcined at 700° C. in the presence of 95% N$_2$ and 5% H$_2$ gas mixture in a tubular furnace for 4 h at 3° C./min temperature ramp. After completing the pyrolysis, 1.01 g of black flaky and light weight powder was collected and washed with distilled water for several times followed by drying to yield Zn doped graphene composites (SAR-Zn-700). The presence of Zn and ZnO in the composite was confirmed by FT-IR and powder XRD analysis, whereas the formation of graphene sheets was confirmed by XRD, Raman and TEM analysis. ICP-OES and CHNS analysis of SAR-Zn-700 revealed the presence of several inorganic constituents as shown in Table 2.

This example teaches the synthesis of ZnO and Zn doped graphene composites. This example further teaches the Zn content in SAR-Zn-700 composites was found to be 18.27 wt %. Besides Zn, the composite SAR-Zn-700 was also found to be doped with other heteroatom.

Example-9

In a typical experimental procedure, 3.57 g of the semi-solid composites composed of *Sargassum* granules and ChoCl—ZnCl$_2$ mixture (as obtained from Example 4) was calcined at 800° C. in the presence of 95% N$_2$ and 5% H$_2$ gas mixture in a tubular furnace for 4 h at 3° C./min temperature ramp. After completing the pyrolysis, 0.798 g of black flaky and light weight powder was collected and washed with distilled water for several times followed by drying to yield Zn doped graphene composites (SAR-Zn-800). The presence of Zn and ZnO in the composite was confirmed by FT-IR and powder XRD analysis, whereas the formation of graphene sheets was confirmed by XRD, Raman and TEM analysis. ICP-OES and CHNS analysis of SAR-Zn-800 revealed the presence of several inorganic constituents as shown in Table 2.

This example teaches the synthesis of Zn and ZnO doped graphene composites. This example further teaches the Zn content in SAR-Zn-800 composites was found to be 4.43 wt %. Besides Zn, the composite SAR-Zn-800 was also found to be doped with other heteroatom.

TABLE 2

Elemental composition of graphene-Zn composites

| Elements | SAR-Zn-700 (%) | SAR-Zn-800 (%) | SAR-Zn-900 (%) |
|---|---|---|---|
| Ca | 5.00 | 6.54 | 6.14 |
| Fe | 0.03 | 0.09 | 0.00 |
| K | 0.85 | 2.23 | 0.41 |
| Mg | 1.53 | 2.08 | 2.01 |
| Mn | 0.01 | 0.0005 | 0.00 |
| Na | 1.33 | 1.51 | 0.70 |
| Ni | 0.06 | 0.00 | 0.02 |
| Zn | 18.27 | 4.43 | 0.82 |

TABLE 2-continued

Elemental composition of graphene-Zn composites

| Elements | SAR-Zn-700 (%) | SAR-Zn-800 (%) | SAR-Zn-900 (%) |
|---|---|---|---|
| C | 45.51 | 46.27 | 44.70 |
| H | 2.91 | 2.34 | 2.74 |
| N | 0.90 | 0.44 | 0.75 |
| S | 1.41 | 1.94 | 0.64 |

Example-10

In a typical experimental procedure, 3.95 g of the semi-solid composites composed of *Sargassum* granules and ChoCl—$ZnCl_2$ mixture (as obtained from Example 4) was calcined at 900° C. in the presence of 95% $N_2$ and 5% $H_2$ gas mixture in a tubular furnace for 4 h at 3° C./min temperature ramp. After completing the pyrolysis, 0.838 g of black flaky and light weight powder was collected and washed with distilled water for several times followed by drying to yield Zn doped graphitic carbon composites (SAR-Zn-900). The presence of Zn in the composite was confirmed by FT-IR and powder XRD analysis, whereas the formation of graphitic carbon was confirmed by XRD, Raman and TEM analysis. ICP-OES and CHNS analysis of SAR-Zn-900 revealed the presence of several inorganic constituents as shown in Table 2.

This example teaches the synthesis of Zn doped graphene composites. This example further teaches the Zn content in SAR-Zn-900 composites was found to be 0.82 wt %. Besides Zn, the composite SAR-Zn-900 was also found to be doped with other heteroatom.

Example-11

In a typical experimental procedure, 5.70 g of the semi-solid composites composed of *Sargassum* granules and ChoCl—$SnCl_2$ mixture (as obtained from Example 4) was calcined at 700° C. in the presence of 95% $N_2$ and 5% $H_2$ gas mixture in a tubular furnace for 4 h at 3° C./min temperature ramp. After completing the pyrolysis, 0.986 g of black flaky powder was collected and washed with distilled water for several times followed by drying to yield Sn doped graphene composites (SAR-Sn-700). The presence of Sn, SnO and $SnO_2$ in the composite was confirmed by FT-IR and powder XRD analysis, whereas the formation of graphene sheets was confirmed by XRD, Raman and TEM analysis. ICP-OES and CHNS analysis of SAR-Sn-700 revealed the presence of several inorganic constituents as shown in Table 3. Surface area analysis of SAR-Sn-700 composite showed that the composites had BET surface area 270.72 m²/g and pore size 3.07 nm.

This example teaches the synthesis of Sn, SnO and $SnO_2$ doped graphene composites. This example further teaches the Sn content in SAR-Sn-700 composites was found to be 17.12 wt %. Thus besides Sn, the composite SAR-Sn-700 was also found to be doped with other heteroatom.

Example-12

In a typical experimental procedure, 6.13 g of the semi-solid composites composed of *Sargassum* granules and ChoCl—$SnCl_2$ mixture (as obtained from Example 4) was calcined at 800° C. in the presence of 95% $N_2$ and 5% $H_2$ gas mixture in a tubular furnace for 4 h at 3° C./min temperature ramp. After completing the pyrolysis, 0.935 g of black flaky powder was collected and washed with distilled water for several times followed by drying to yield Sn doped graphene composites (SAR-Sn-800). The presence of Sn, SnO and $SnO_2$ in the composite was confirmed by FT-IR and powder XRD analysis, whereas the formation of graphene sheets was confirmed by XRD, Raman and TEM analysis. ICP-OES and CHNS analysis of SAR-Sn-800 revealed the presence of several inorganic constituents as shown in Table 3. Surface area analysis of SAR-Sn-800 composite showed that the composites had BET surface area 98.39 m²/g and pore size 8.69 nm.

This example teaches the synthesis of Sn, SnO and $SnO_2$ doped graphene composites. This example further Leaches the Sn content in SAR-Sn-800 composites was found to be 14.76 wt %. Thus besides Sn, the composite SAR-Sn-800 was also found to be doped with other heteroatom.

TABLE 3

Elemental composition of graphene-Sn composites

| Elements | SAR-Sn-700 (%) | SAR-Sn-800 (%) | SAR-Sn-900 (%) |
|---|---|---|---|
| Ca | 4.68 | 5.25 | 5.23 |
| Cu | 0.00 | 0.00 | 0.00 |
| Fe | 0.17 | 0.00 | 0.00 |
| K | 0.75 | 0.94 | 0.67 |
| Mg | 1.55 | 1.75 | 1.64 |
| Mn | 0.00 | 0.00 | 0.00 |
| Na | 1.25 | 1.33 | 1.25 |
| Ni | 0.00 | 0.01 | 0.01 |
| Zn | 2.62 | 1.88 | 1.53 |
| Sn | 17.12 | 14.76 | 12.28 |
| C | 40.32 | 34.89 | 23.97 |
| H | 2.05 | 2.15 | 2.09 |
| N | 1.17 | 0.67 | 0.39 |
| S | 1.03 | 0.80 | 0.12 |

Example-13

In a typical experimental procedure, 5.74 g of the semi-solid composites composed of *Sargassum* granules and ChoCl—$SnCl_2$ mixture (as obtained from Example 4) was calcined at 900° C. in the presence of 95% $N_2$ and 5% $H_2$ gas mixture in a tubular furnace for 4 h at 3° C./min temperature ramp. After completing the pyrolysis, 0.856 g of black flaky powder was collected and washed with distilled water for several times followed by drying to yield Sn doped graphene composites (SAR-Sn-900). The presence of Sn in the composite was confirmed by FT-IR and powder XRD analysis, whereas the formation of graphene sheets was confirmed by XRD, Raman and TEM analysis. ICP-OES and CHNS analysis of SAR-Sn-900 revealed the presence of several inorganic constituents as shown in Table 3.

This example teaches the synthesis of Sn doped graphene composites. This example further teaches the Sn content in SAR-Sn-900 composites was found to be 12.28 wt %. Thus besides Sn, the composite SAR-Sn-900 was also found to be doped with other heteroatom.

Figure 3:
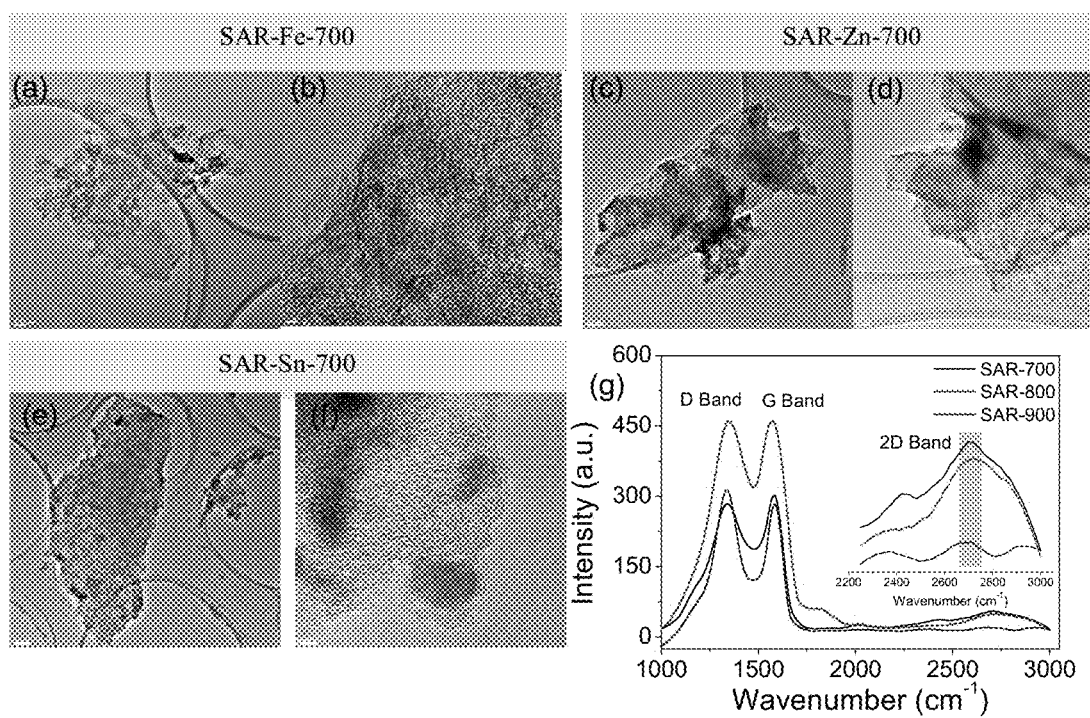
FIG. 3: (a-f) TEM images different graphene nanosheets having various functionalities and (g) Raman spectra of magnetic graphene nanosheets.

FIG. 3 provides (a-f) TEM images of different graphene nanosheets having various functionalities and (g) Raman spectra of magnetic graphene nanosheets Example-14

In a typical experimental procedure, 5 g of dried *Kappaphycus alvarezii* granules (18 wt % moisture) was added to ChoCl:FeCl$_3$ (1:2) in 1:2 weight ratio (optimized amount sufficient to soak the granules) followed by heating at 80° C. for 30 min. until a semi-solid composites is formed. 5.42 g of this semi-solid composite was calcined at 800° C. in a tubular furnace in the presence of 95% N$_2$ and 5% H$_2$ gas mixture for 4 h at 3° C./min. temperature ramp. After completing the pyrolysis, 1.64 g of brown powder was collected and washed with distilled water for several times followed by drying to yield doped graphene composites (KAP-Fe-800). The presence of Fe$_3$O$_4$ in major amount and a small fraction Fe in the composite was confirmed by powder XRD analysis and FTIR analysis, whereas the formation of graphene sheets was confirmed by Raman and TEM analysis. CHNS analysis of KAP-Fe-800 revealed the presence of C (9.31%), H (1.18%), N (0.10%), and S (1.28%) and the other elemental composition is shown in Table 4.

The above experiment was repeated using ChoCl:ZnCl$_2$ (1:2) and ChoCl:SnCl$_2$ (1:2) as deep eutectic solvent and *Kappaphycus* granules. The other experimental conditions were similar.

This example teaches the synthesis of functionalized graphene composites from *Kappaphycus alvarezii* granules. This example further teaches that the present invention not limited to *Sargassum* seaweed, other biomass can be converted to graphene composites through the procedure disclosed herein.

TABLE 4

Elemental composition of graphene-Fe composites

| | Elements | | | | | | | | | | | |
|---|---|---|---|---|---|---|---|---|---|---|---|---|
| Ca | Cu | Fe | K | Mg | Mn | Na | Ni | Zn | C | H | N | S |
| | | | | | | % (w/w) | | | | | | |

| | Ca | Cu | Fe | K | Mg | Mn | Na | Ni | Zn | C | H | N | S |
|---|---|---|---|---|---|---|---|---|---|---|---|---|---|
| KAP-Fe-800 | 1.14 | 0.01 | 3.83 | 5.57 | 0.28 | 0.36 | 1.17 | 0.04 | 1.05 | 40.32 | 2.05 | 1.17 | 1.03 |

Example-15

In a typical experimental procedure, the metal doped graphene composite (as obtained from Example 5-14) were washed with 6N HCl aqueous solution followed by washed with distilled water for several times to neutralized the graphene sheets. After completed the neutralization process, the graphene samples were drying in an oven to obtained metal free graphene. The formation of metal free graphene sheets were confirmed by powder XRD.

This example teaches the synthesis of graphene sheets without any doping of heteroatom.

Example-16

In a control experimental procedure, 1 gm of *sargassum* granules was calcined at 700° C. under N$_2$ atmosphere with 3° C./min ramp for 3 h. After completion of the pyrolysis, the black carbon materials was collected and washed with milli-Q water. The TEM, XRD and AFM analysis did not support for the production graphene nanosheets for this carbon material.

This example teaches formation of amorphous carbon when only *Sargassum* granule was pyrolysed.

Example-17

In another control experimental procedure, 1 gm of choline chloride was pyrolysed under similar condition as mention in Example 16 above. After pyrolysis very minor amount of mass left. This corresponds to amorphous carbon.

This example teaches formation of amorphous carbon when only choline chloride was pyrolysed.

Example-18

In a typical experimental procedure, 0.01 g of the SAR-Fe-700 (as obtained from the Example 5) was added to the 20 mL of fluoride contaminated drinking water (fluoride content were in the range of 2.72-6.71 ppm) which was collected from village of Govind Garh, Rajasthan, India (26°45' N, 74°38' E). After this, the solution was shaken at room temperature for 2 h (optimised condition) followed by filtration through Whalman filter paper No. 42. The filtrate was collected and analyzed for the fluoride ion concentration. After treating with SAR-Fe-700 the concentration of fluoride reduced to 0.85 ppm (below WHO standard) from initial concentration of 3.62 ppm i.e. 76% removal efficiency. The above experiment was repeated with SAR-Fe-800 and SAR-Fe-900, respectively.

This Example teaches the metal doped graphene nanosheets were able to removes fluoride ion from drinking water. This example also teaches the SAR-Fe-700 graphene composites showed maximum fluoride removal efficiency in comparison to SAR-Fe-800 and SAR-Fe-900.

ADVANTAGE OF THE INVENTION

The main advantage of the present invention is the use of inexpensive naturally abundant seaweed biomass as a precursor for the production of functionalized graphene sheets by the intervention of deep eutectic solvents (DESs) having tunable functionalities. The use of seaweeds as a source of materials is another advantage as they are cultivable which does not need fresh water irrigation unlike terrestrial plants making them abundant for large scale exploitation, the seaweeds are bestowed with very good growth rate and can be harvested multiple times unlike other terrestrial plants. The use of deep eutectic solvents obtained by the complexation between choline chloride and Lewis acids such as FeCl$_3$, ZnCl$_2$ and SnCl$_2$ makes the process advantageous by producing the graphene sheets functionalized with metal functionalities present in the DESs.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A process for the preparation of facile production of functionalized graphene sheets using seaweed biomass as precursor and deep eutectic solvents (DESs) acting as both catalyst and template, comprising the steps of;
   (i) crushing the seaweeds mechanically to yield a liquid and residue in granular form;
   (ii) separating the liquid part from the residual part;
   (iii) obtaining the residual part in the granular form from step (ii);
   (iv) treating the granules obtained in step (iii) with deep eutectic solvents followed by pyrolysis under inert atmosphere and high temperature which produces functionalized graphene sheets.

2. The process as claimed in claim 1 wherein the seaweed biomass used is selected from brown seaweeds, green seaweeds, and red seaweeds.

3. The process as claimed in claim 1 wherein the obtained liquid consist of plant micro and macro nutrients and plant growth regulators.

4. The process as claimed in claim 1 wherein the granules obtained from *Sargassum* seaweed contains Na+ (1-1.5 wt %), K+ (0.5-1 wt %), $Ca^{2+}$ (1.5-2 wt %), $Mg^{2+}$ (1-1.5 wt %), $Fe^{2+/3+}$ (0-0.5 ppm), $Zn^{2+}$ (0.01-0.02 wt %), $Cu^{2+}$ (2-3 ppm), $Mn^{2+}$ (15-20 ppm), C (34-35%), H (4-5%), N (1.3-1.6%) and S (0.5-1%).

5. The process as claimed in claim 1 wherein the functionalized graphene either doped with Fe, Sn or Zn depending on the composition of the deep eutectic solvents used to prepare the composites of the seaweeds.

6. The process as claimed in claim 1 wherein the used deep eutectic solvents are obtained by the complexation of choline chloride with Lewis acids.

7. The process as claimed in claim 1 wherein semi-solid composite can also be prepared by mixing seaweed granules with $ChoCl—FeCl_3$ (1:2), $ChoCl—ZnCl_2$ (1:2) and $ChoCl—SnCl_2$ (1:2), respectively with 1:2 to 1:3 weight ratio of granule to deep eutectic solvent.

8. The process as claimed in claim 1 wherein the preparation of functionalized graphene sheets involves pyrolysis in 95% $N_2$ and 5% $H_2$ atmosphere for different durations.

9. The process as claimed in claim 1 wherein the semi-solid composites of *Sargassum* granule and $ChoCl—FeCl_3$ 1:2 is calcined at 700° C.-900° C. to give heteroatom doped magnetic graphene nanosheets containing various elements.

10. The process as claimed in claim 1 wherein the obtained functionalized graphene samples have reasonably good porosity of 2.7-4.1 nm characteristic of mesoporous material suitable for electrical double layer capacitors (EDLC).

11. The process as claimed in claim 1 wherein the obtained functionalized graphene samples have good electrical conductivity of 2384 $mS·m^{-1}$ to 2400 $mS·m^{-1}$.

12. The process as claimed in claim 1 wherein the obtained functionalized graphene samples have reasonably high BET surface area of 120-225 $m^2·g^{-1}$.

13. The process as claimed in claim 1 wherein the obtained functionalized graphene can remove 95-98% fluoride from drinking water collected from village of Govind Garh, Rajasthan, India (26° 45' N, 74° 38' E).

14. The process as claimed in claim 1 wherein the separation of graphene sheets after the adsorption of fluoride on the sheets can be done by using ordinary magnets in the case of magnetised graphene sheets.

15. The process as claimed in claim 2 wherein the seaweed biomass used includes a brown seaweed, and wherein said brown seaweed is selected from *Sargassum tenerrimum* and *Sargassum wighti*.

16. The process as claimed in claim 2 wherein the seaweed biomass used includes a green seaweed, and wherein said green seaweed is selected from *Ulva faciata* and *Ulva lactuca*.

17. The process as claimed in claim 2 wherein the seaweed biomass used includes a red seaweed, and wherein said red seaweed is *Kappaphycus alvarezii*.

18. The process as claimed in claim 6 wherein the Lewis acids are selected from $FeCl_3$ ($ChoCl—FeCl_3$ 1:2), $ZnCl_2$ ($ChoCl—ZnCl_2$ 1:2), and $SnCl_2$ ($ChoCl—SnCl_2$ 1:2).

19. The process as claimed in claim 9 wherein the various elements are selected from Nat, $K^+$, $Ca^{2+}$, $Mg^{2+}$, $Fe^{2+/3+}$, $Zn^{2+}$, $Cu^{2+}$, $Mn^{2+}$, $Sn^{2+}$, C, H, N and S.

* * * * *

UNITED STATES PATENT AND TRADEMARK OFFICE
CERTIFICATE OF CORRECTION

PATENT NO. : 10,549,997 B2
APPLICATION NO. : 15/330852
DATED : February 4, 2020
INVENTOR(S) : Kamlesh Prasad et al.

It is certified that error appears in the above-identified patent and that said Letters Patent is hereby corrected as shown below:

On the Title Page

Item (57), Column 2 (Abstract), Line 3, "from a naturally abundant seaweed resources" should be --from naturally abundant seaweed resources--.

Item (57), Column 2 (Abstract), Lines 7-8, "as a raw material and a deep eutectic solvents" should be --as a raw material and deep eutectic solvents--.

Item (57), Column 2 (Abstract), Line 10, "for the production graphene" should be --for the production of graphene--.

Item (57), Column 2 (Abstract), Line 13, "resulted formation" should be --resulted in formation--.

In the Specification

Column 1, Line 51, "comprising of impregnation" should be --comprising impregnation--.

Column 1, Lines 66-67, "comprising of activated carbon" should be --comprising activated carbon--.

Column 3, Line 14, "were obtained" should be --was obtained--.

Column 4, Lines 7-9, "the present invention provides sustainable and scalable process for the synthesis of graphene nanosheets with tunable functionalities which comprise" should be --the present invention provides a sustainable and scalable process for the synthesis of graphene nanosheets with tunable functionalities which comprises--.

Column 4, Line 18, "obtain" should be --obtained--.

Column 6, Line 25, "BRIEF DESCRIPTION OF DRAWING" should be --BRIEF DESCRIPTION OF DRAWINGS--.

Signed and Sealed this
Thirtieth Day of June, 2020

Andrei Iancu
*Director of the United States Patent and Trademark Office*

CERTIFICATE OF CORRECTION (continued)
U.S. Pat. No. 10,549,997 B2

Column 6, Line 26, add "The patent or application file contains at least one drawing executed in color. Copies of this patent or patent application publication with color drawing(s) will be provided by the Office upon request and payment of the necessary fee.".

Column 6, Line 56, "obtain" should be --obtained--.

Column 7, Lines 8-10, "production of graphene directly from carbon source required template which mostly metal salts," should be --production of graphene directly from a carbon source required a template which is mostly metal salts,--.

Column 7, Lines 16-17, "ration to soak the complete solvents was one of the inventive step" should be --ratio to soak the complete solvents was one of the inventive steps--.

Column 7, Line 23, "thorough tubular furnace" should be --through a tubular furnace--.

Column 7, Lines 25-26, "production high quality graphene" should be --production of high quality graphene--.

Column 7, Line 43, "were formed" should be --was formed--.

Column 7, Line 53, "which were stored" should be --which was stored--.

Column 7, Line 66, "centrifuge" should be --centrifuged--.

Column 8, Line 17, "composites" should be --composite--.

Column 8, Lines 37-38, "water for several times" should be --water several times--.

Column 8, Line 47, "composites" should be --composite--.

Column 9, Lines 24-25, "water for several times" should be --water several times--.

Column 9, Line 33, "composites" should be --composite--.

Column 9, Line 58, "water for several times" should be --water several times--.

Column 9, Line 60, "Fein major amount" should be --Fe in a major amount--.

Column 9, Line 66, "composites" should be --composite--.

Column 10, Line 18, "water for several times" should be --water several times--.

Column 10, Line 41, "water for several times" should be --water several times--.

Column 11, Line 22, "water for several times" should be --water several times--.

CERTIFICATE OF CORRECTION (continued)
U.S. Pat. No. 10,549,997 B2

Column 11, Lines 44-45, "water for several times" should be --water several times--.

Column 12, Lines 2-3, "water for several times" should be --water several times--.

Column 12, Line 16, "composites" should be --composite--.

Column 12, Line 56, "composites" should be --composite--.

Column 13, Line 3, "composites" should be --composite--.

Column 13, Line 8, "water for several times" should be --water several times--.

Column 13, Line 11, "a small fraction Fe" should be --a small fraction of Fe--.

Column 13, Line 24, "the present invention not" should be --the present invention is not--.

Column 13, Lines 42-44, "(as obtained from Example 5-14) were washed with 6N HCl aqueous solution followed by washed with distilled water for several times" should be --(was obtained from Examples 5-14) was washed with 6N HCl aqueous solution followed by washing with distilled water several times--.

Column 13, Lines 45-46, "After completed the neutralization process, the graphene samples were drying in oven to obtained" should be --After completion of the neutralization process, the graphene samples were dried in an oven to obtain--.

Column 13, Line 57, "materials" should be --material--.

Column 13, Lines 58-59, "analysis did not support for the production graphene" should be --analyses did not support the production of graphene--.

Column 14, Line 1, "mention" should be --mentioned--.

In the Claims

Column 15, Line 5 (Claim 1), "of;" should be --of:--.

Column 15, Line 19 (Claim 3), "consist" should be --consists--.

Column 15, Line 22 (Claim 4), "contains" should be --contain--.

Column 15, Line 28 (Claim 5), "graphene either doped with" should be --graphene is either doped with--.

Column 15, Line 34 (Claim 7), "wherein semi-solid" should be --wherein the semi-solid--.

Column 16, Line 2 (Claim 9), "composites" should be --composite--.

CERTIFICATE OF CORRECTION (continued)
U.S. Pat. No. 10,549,997 B2

Column 16, Line 27 (Claim 15), "*wighti*." should be --*wightii*.--.

Column 16, Line 39 (Claim 19), "Nat," should be --$Na^+$,--.